United States Patent [19]

Mita

[11] Patent Number: 4,469,188
[45] Date of Patent: Sep. 4, 1984

[54] ARTICULATED TRICYCLE
[75] Inventor: Yoshinori Mita, Saitama, Japan
[73] Assignee: Honda Giken Kogyo Kabushiki Kaisha, Tokyo, Japan
[21] Appl. No.: 472,083
[22] Filed: Mar. 4, 1983

[30] Foreign Application Priority Data

Mar. 19, 1982 [JP] Japan ................................ 57/44212

[51] Int. Cl.³ ............................................ B62D 61/08
[52] U.S. Cl. .................................. 180/215; 180/217; 280/282; 464/145; 464/906
[58] Field of Search ................ 180/215, 210, 213, 217; 280/62, 111, 112 R, 112 A, 220, 282; 464/145, 906

[56] References Cited

U.S. PATENT DOCUMENTS

| 3,448,992 | 6/1969 | Wilfert et al. ............... | 280/112 R |
| 3,504,934 | 4/1970 | Wallis .......................... | 280/282 |
| 3,583,727 | 6/1971 | Wallis .......................... | 280/283 |
| 3,938,609 | 2/1976 | Kensaku et al. ............ | 180/210 |
| 4,159,752 | 7/1979 | Kanno ......................... | 280/282 X |

FOREIGN PATENT DOCUMENTS

| 124993 | 10/1931 | Austria ............... | 180/210 |
| 617021 | 3/1961 | Canada ............... | 280/112 R |
| 55-36681 | 3/1980 | Japan ................. | 464/145 |
| 55-36682 | 3/1980 | Japan ................. | 464/145 |
| 2045705 | 11/1980 | United Kingdom .... | 180/210 |

Primary Examiner—Joseph F. Peters, Jr.
Assistant Examiner—Mitchell J. Hill
Attorney, Agent, or Firm—Lyon & Lyon

[57] ABSTRACT

An articulated tricycle of the swingable type employing a front body and a rear body, the front body having a front wheel and the rear body having two rear wheels mounted on an axle. The rear body includes a first body member and a second body member. The first body member is pivoted about a transverse axis to the front body while the second body member is pivotally mounted about a longitudinal axis to the first body member. The second body member includes mounting for the rear wheels. A gear train extends between an engine, located in the front body, and the rear axle. This gear train may pass through either the first body member or second body member and includes a chain drive. Either the drive sprocket or the driven sprocket is positioned about a constant velocity universal joint which is in turn positioned about a transverse shaft or the transverse rear axle.

14 Claims, 14 Drawing Figures

ARTICULATED TRICYCLE

BACKGROUND OF THE INVENTION

The field of the present invention is articulated tricycles and the structure and drive thereof.

Articulated or swingable tricycles have been developed such as illustrated in FIG. 13. In such tricycles, a front body 10 includes a front wheel 12 which is steerable by means of the conventional handlebars 14, a seat 16 and the requisite frame structure to support same. A rear body 18 includes two rear wheels 20, an engine 22 and a power train 24. The engine 22 is coupled to an axle of the rear wheels 20 through the power train 24 by a conventional chain and sprocket mechanism. The tricycle is articulated between the front body 10 and the rear body 18 such that the rear body 18 may swing in a vertical plane about a transverse axis 25 through bracket 26; and the front body 10 may roll relative to the rear body 18 and relative to the ground about a longitudinal axis through a rolling joint 28. The rolling joint includes a joint case 30 privotally mounted to the bracket 26 and a shaft 32 extending into the joint case 30. The shaft 32 is fixed to the rear body 18. Thus, a relative motion between the front body 10 and the rear body 18 may occur about the transverse axis of the bracket 26 and the longitudinal axis of the rolling joint 28. A cushion member 34 acts as a suspension mechanism between the front body 10 and the rear body 18.

The operation of such articulated tricycles is to have the front body lean or roll into a turn while the rear body remains upright with both wheels 20 remaining on the ground. The tricycle is suspended using a conventional front wheel cushion and the cushion member 34. Thus, the entire rear body 18, including the engine 22, the power train 24 and the rear wheels 20, acts as unsprung weight. Because of the nature of this arrangement, a substantial percentage of the mass of the tricycle is unsprung. Additionally, the length of the rear body 18 is generally determined by the space required for the engine 22, the power train 24 and the wheels 20. The effective length creates a substantial moment arm. Thus, the unsprung mass for such articulated tricycles has a relatively high inertia and moment of inertia. This detracts from the ride of the vehicle and makes the design of an optimum cushioning system difficult.

Another articulated or swingable tricycle having a reduced unsprung mass but having an engine mounted on the rolling portion of the vehicle is illustrated in copending U.S. patent application to Kawasaki, entitled Articulated Tricycle, Ser. No. 472,716, filed Mar. 7, 1983, having priority filing dates in Japan of Mar. 17, 1982 and of Mar. 25, 1982. The Kawasaki Application is incorporated herein by reference.

SUMMARY OF THE INVENTION

The present invention is directed to an articulated tricycle of the swingable type having a front body and a rear body, the front body being allowed to roll about a longitudinal axis relative to the rear wheels. The device of the present invention includes an engine which is mounted in the front body and which drives the rear wheels. The rear body is divided into two members, the first of which is mounted to the front body about a transverse axis and the second of which is mounted to the first about a longitudinal axis and has the rear wheels mounted thereto. A power train extends between the engine mounted in the front body and the axle of the rear wheels mounted to the second body member of the rear body.

The foregoing configuration moves the engine into the sprung portion of the vehicle. This allows the unsprung portion to be both lighter in weight and shorter in length. Thus, unsprung inertia and moment of inertia are reduced. The cushioning system may then be better employed to provide adequate suspension and a reasonable ride. In this way, the present configuration avoids the difficulties associated with prior articulated tricycles having the engine mounted in the rear body.

Accordingly, it is an object of the present invention to provide an improved articulated tricycle of the swingable type. Other and further objects and advantages will appear hereinafter.

DETAILED DESCRIPTION OF THE PREFERRED EMBODIMENTS

Figure 1:
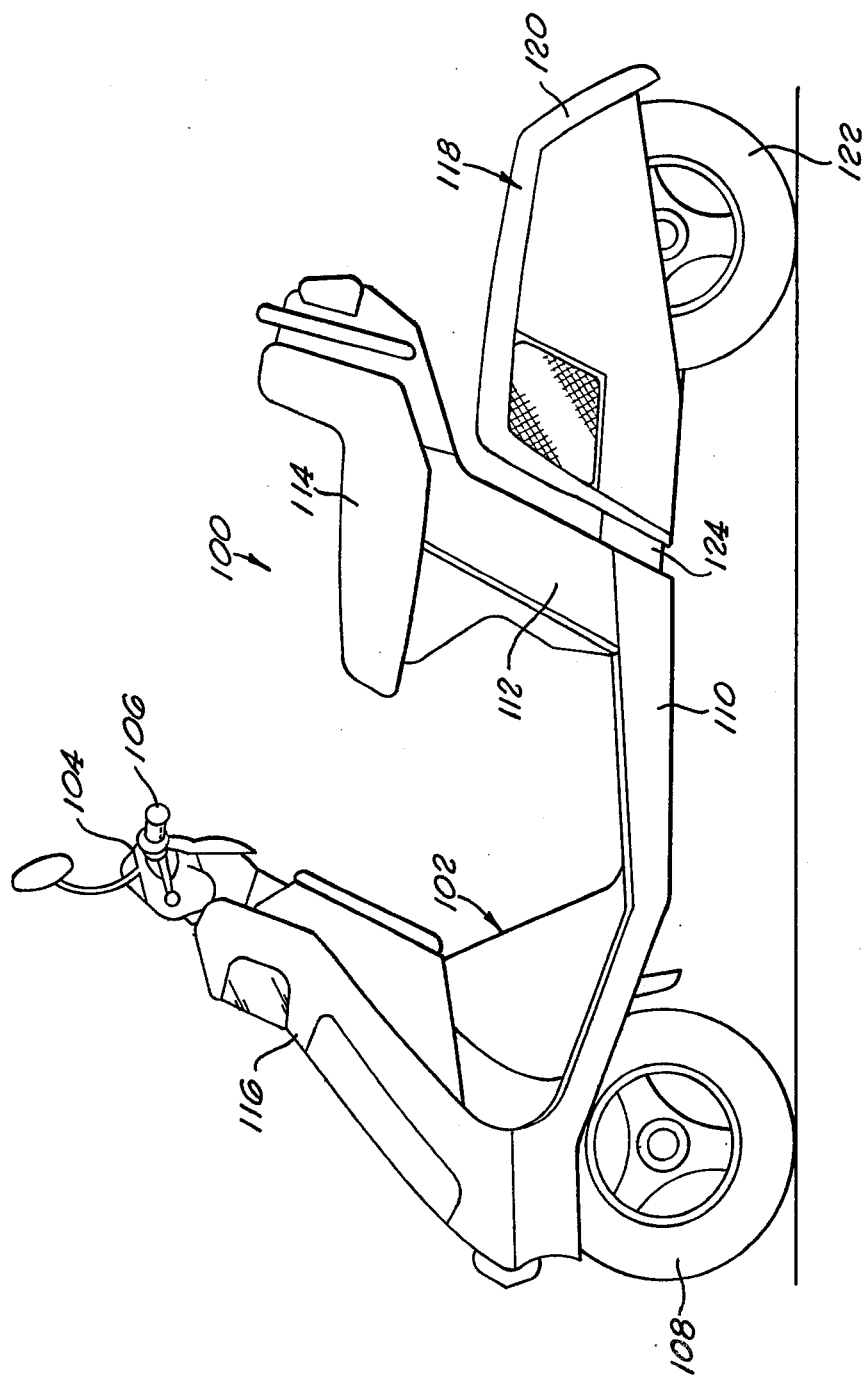
FIG. 1 is a side elevation of an articulated tricycle of the present invention.

Turning in detail to the drawings and particularly the first embodiment illustrated in FIGS. 1–5, an articulated tricycle 100 of the swingable type is illustrated. The tricycle 100 includes a front body 102 to which is pivotally mounted a steerable front wheel mechanism 104 including handlebars 106 and a front wheel 108. As the articulated tricycle may find uses for other than wheeled vehicles, means for supporting both the front and the rear of the tricycle other than wheels are contemplated by this invention. Included as part of the front body 102 is a floor section 110, a seat post 112 supporting a seat 114 and a front panel 116.

The articulated tricycle 100 also includes a rear body 118. The rear body 118 includes a housing or shell 120 and is supported stably on the ground by support means, in the present embodiment two rear wheels 122. The front body 102 and the rear body 118 are joined by means of an articular mechanism spanning the two body sections at 124.

Mounted adjacent the seat post 112 most advantageously at the floor section 110 is an engine 126. The engine is designed for motive power for the tricycle and may be selected from a wide range of mechanisms particularly adapted to small vehicles and the like. The engine is connected by means of gearing to a gear wheel 128. The gear wheel 128 is thus considered to provide the output from the engine 126. This gear wheel 128 is arranged to rotate about a transverse axis extending through a transversely mounted shaft 130. The shaft 130 is fixed to the front body 102 as can be seen in FIG. 3.

Figure 2:
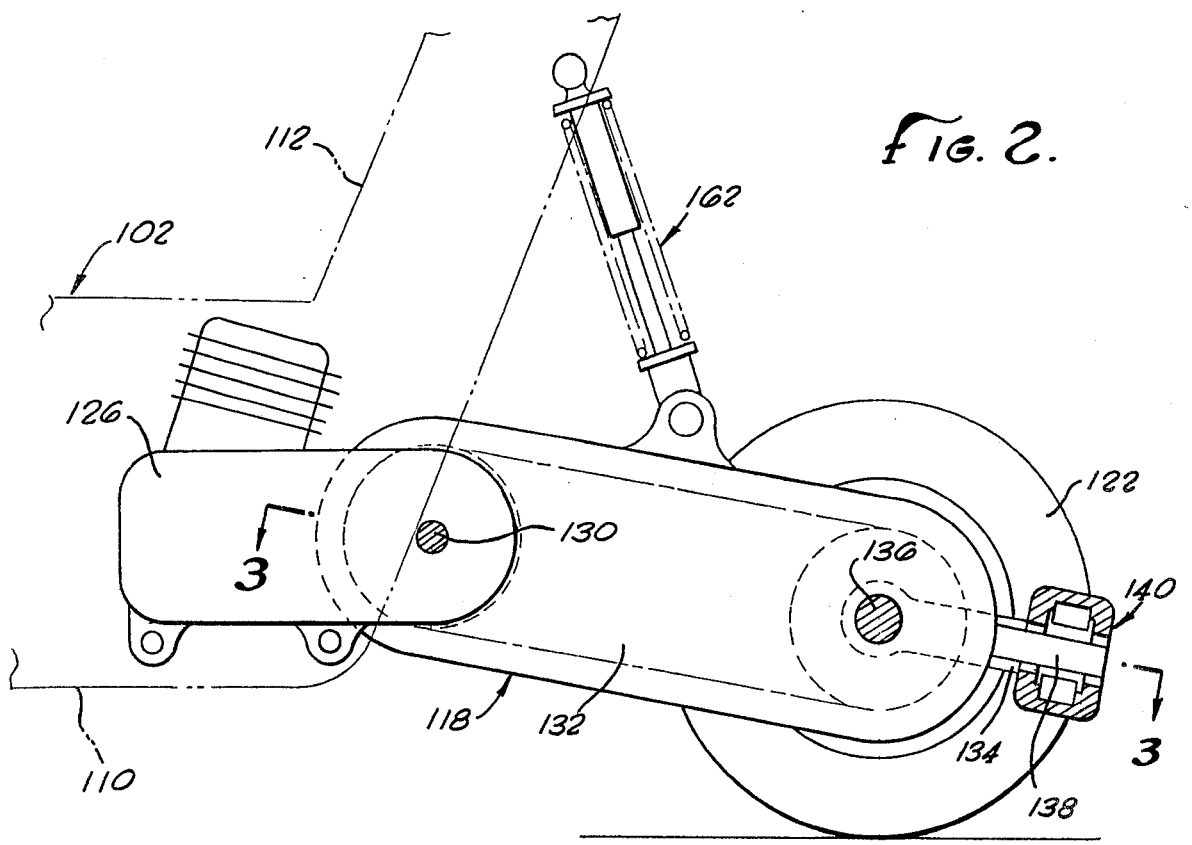
FIG. 2 is a side elevation illustrating the construction of the rear portion of the tricycle.
Figure 3:
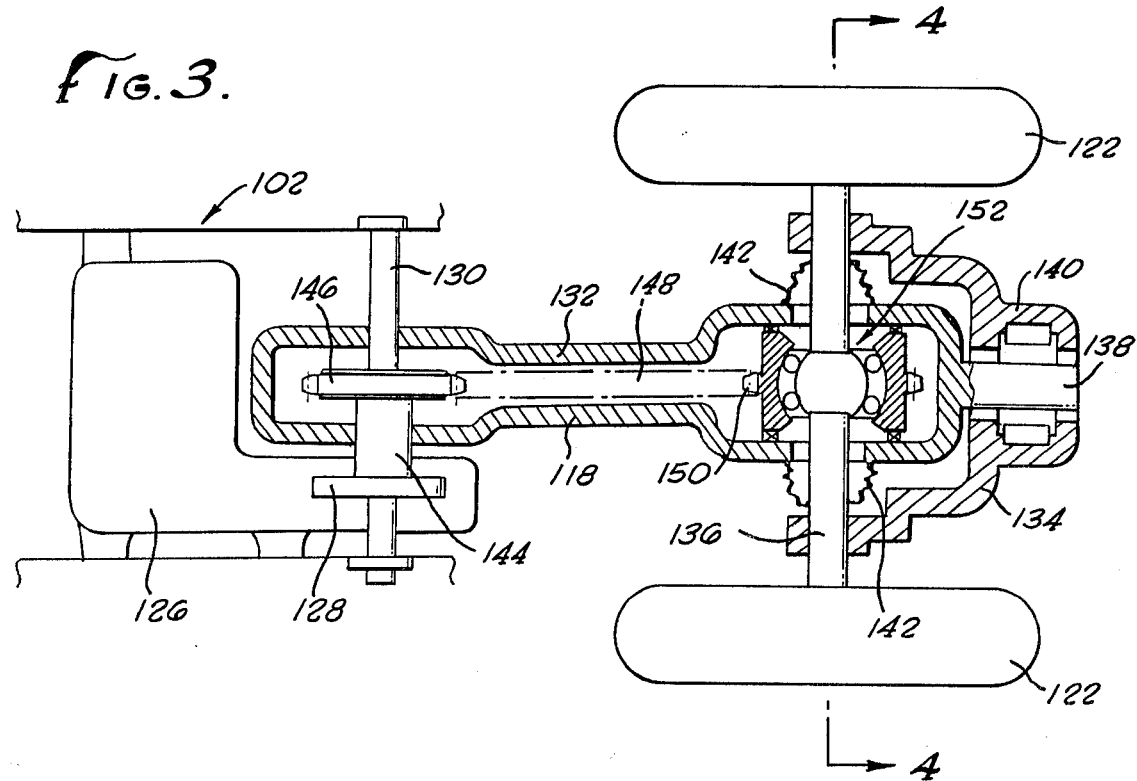
FIG. 3 is a cross-sectional plan view taken along line 3—3 of FIG. 2.
Figure 4:
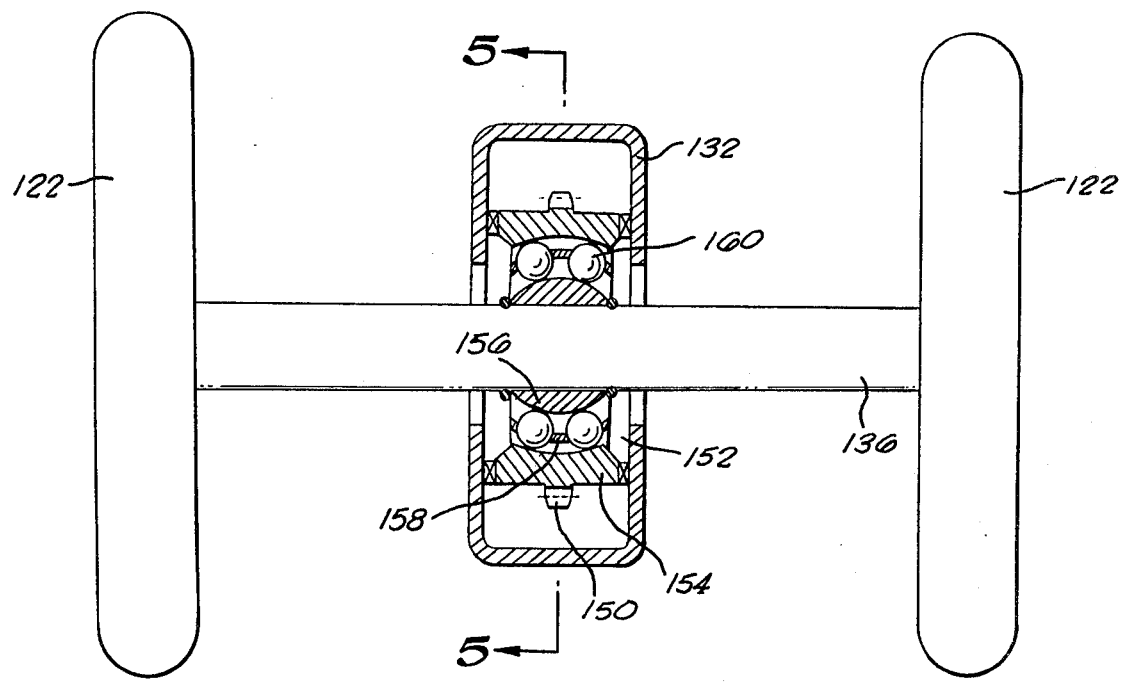
FIG. 4 is a cross-sectional elevation taken along line 4—4 of FIG. 3.

The rear body 118 is best illustrated in its first embodiment in FIGS. 2, 3 and 4. This embodiment includes a first body member 132 and a second body member 134. The first body member 132 is pivotally mounted about the transverse axis of the gear wheel 128 at the shaft 130. Thus, the first body member 132 is able to move in a vertical plane about the shaft 130. The first body member 132 extends rearwardly from the shaft 130 to surround a rear axle 136. The rear axle 136 also extends transversely of the vehicle between the rear wheels 122. Additionally, a journal 138 extends rearwardly from the first body member 132.

The axle 136 and the wheels 122 are mounted to the second body member 134 as can best be seen in FIG. 3. This second body member 134 includes a journal box 140 which cooperates with the journal 138 of the first body member 132. A Neidhart mechanism may be provided at the journal 138 and journal box 140. Thus, the second body member 134 is pivotally mounted about a longitudinal axis to the first body member 132. Both body members 132 and 134 then act as a unit pivoting about the transverse axis at the shaft 130. In this way, the rear wheels may be fixed in a trailing link type suspension mechanism and the front body 102 may independently roll into turns while both rear wheels remain on the ground. Because of the relative motion between the first body member 132 and the second body member 134, elastomeric boots 142 surround the axle 136 to protect the interior of the first body member 132.

Located interior to the first body member 132 is a drive train coupling the engine 126 and the rear axle 136, and in turn the rear wheels 122. The drive train is a continuous flexible loop drive having a flexible loop, a drive wheel and a driven wheel. In the preferred embodiment, a chain 148, drive sprocket 146 and driven sprocket 150 are employed. A V-belt or toothed belt and pulleys may also be employed depending on the power requirements of the system. A hollow drive shaft 144 is fixed to the gear wheel 128 and is rotatably mounted about the shaft 130. Also mounted to the hollow drive shaft 144 is the drive sprocket 146. Thus, the drive sprocket 146 may be powered by the engine 146 and rotates about a transverse axis so as to accommodate the chain 148 which extends rearwardly from the area of the engine to the area of the rear axle 136.

Located about the rear axle 136 is the driven sprocket 150. The driven sprocket 150 cooperates with the drive sprocket 146 and the intermediate chain 148 to power the rear wheels. To couple the driven sprocket 150 with the rear axle 136, a constant velocity universal joint is positioned between the driven sprocket 150 and the axle 136. The U-joint 152 includes an outer ring 154 having a spherical interior surface. An inner ring 156 has an outer spherical surface. A ball cage 158 of sperical arrangement is positioned between the outer ring 154 and the inner ring 156. Balls 160 ride in grooves in both the outer and inner rings 154 and 156.

Figure 5:
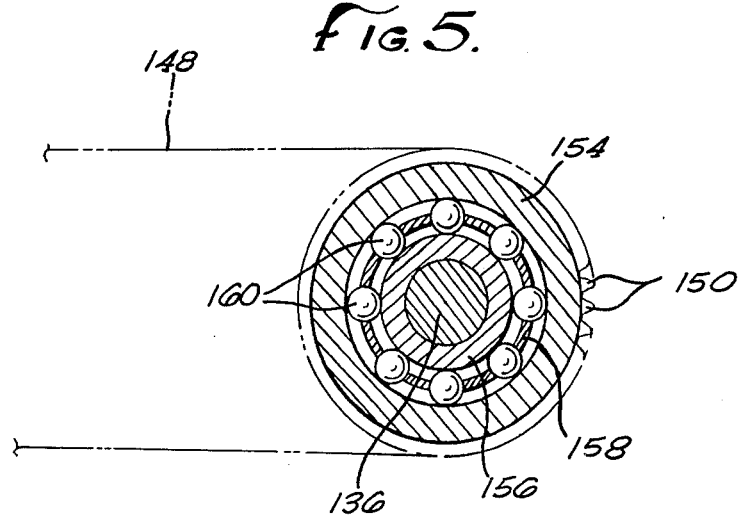
FIG. 5 is a cross-sectional elevation taken along line 5—5 of FIG. 4.
Figure 14:
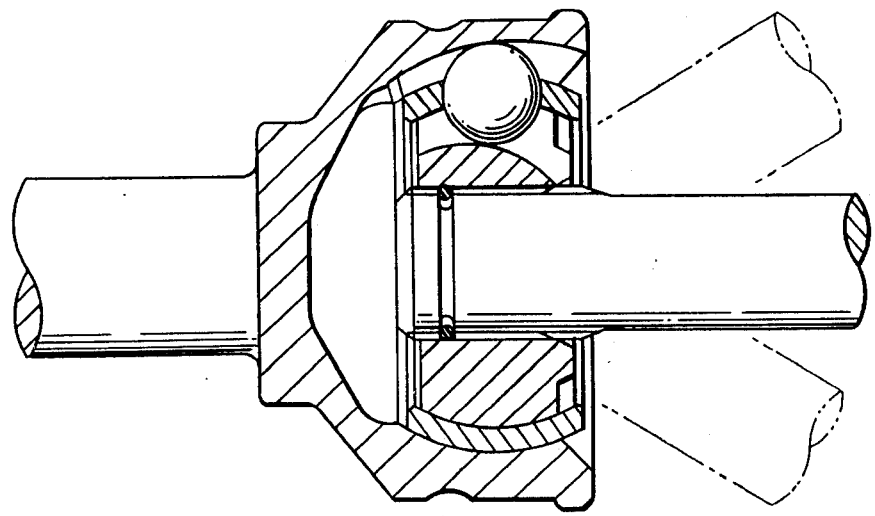
FIG. 14 is a conventional constant velocity universal joint arrangement.
Figure 13:
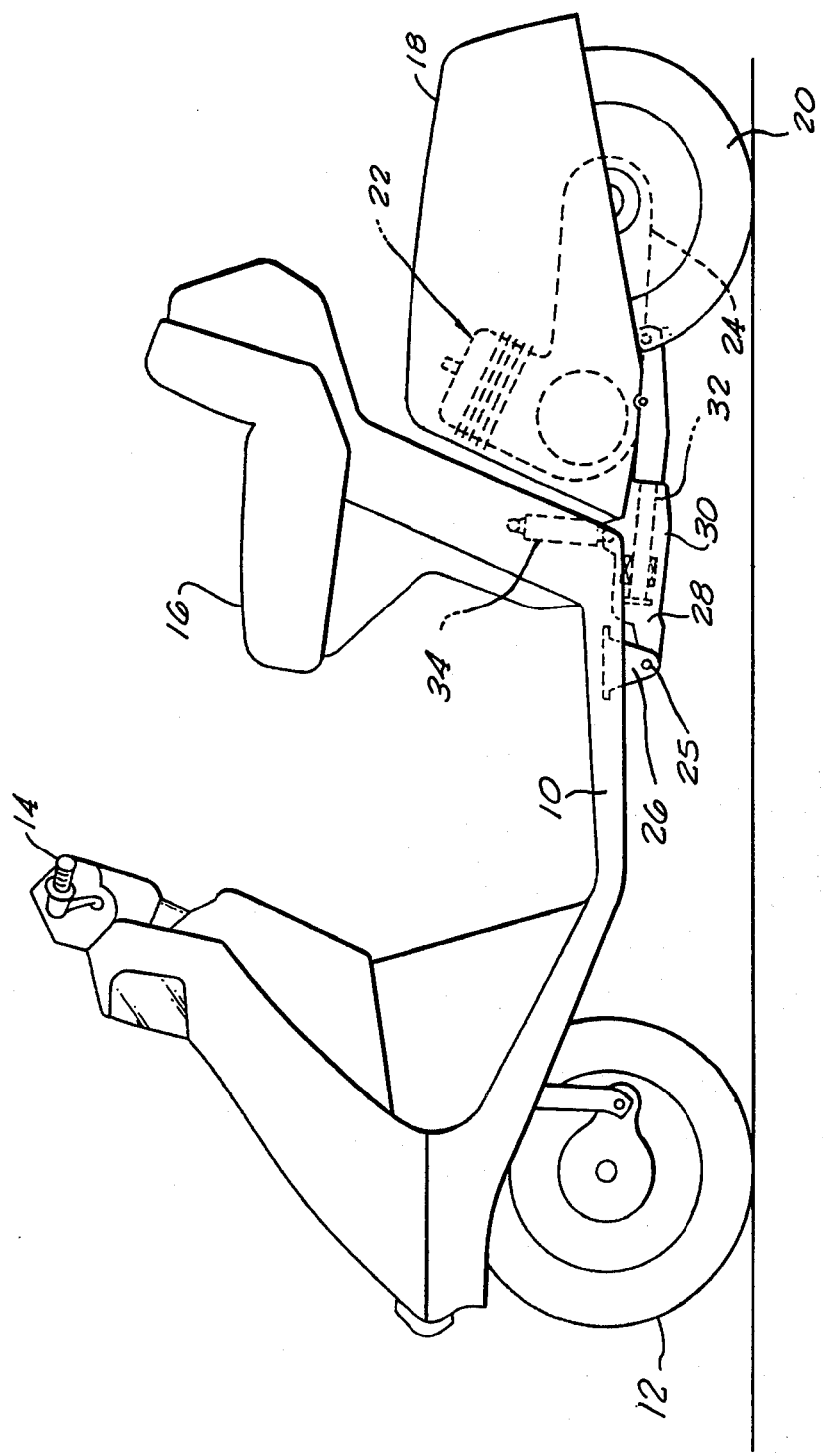
FIG. 13 is a prior art articulated tricycle shown in side elevation.

A more conventional constant velocity universal joint is depicted in FIG. 14. This device joins two shafts for mutual rotation. In the present embodiment as illustrated in FIGS. 3, 4 and 5, the axle 136, and the surrounding sprocket 150 are joined instead. Thus, the axle 136 may pivot about a longitudinal axis without resulting in derailment of the chain 148.

With the rear body 118 thus mounted, such that it may pivot about the transverse axis, a cushion member 162 extends between the first body member 132 and the front body 102 to provide resilient and damped restraint of the front and rear body 102 and 118 relative to one another. As can be seen in FIG. 2, a minimum amount of unsprung weight and body length are exhibited in association with the rear body 118.

Figure 6:
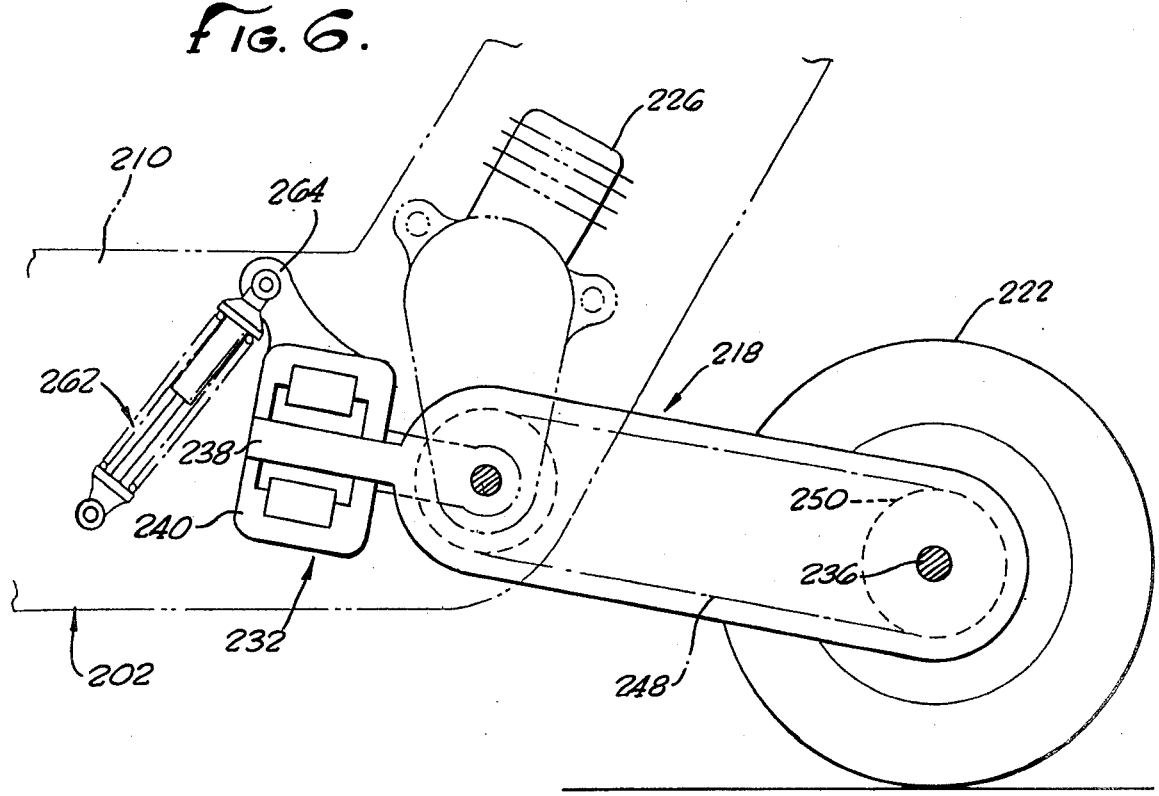
FIG. 6 illustrates a second embodiment shown in side elevation.
Figure 7:
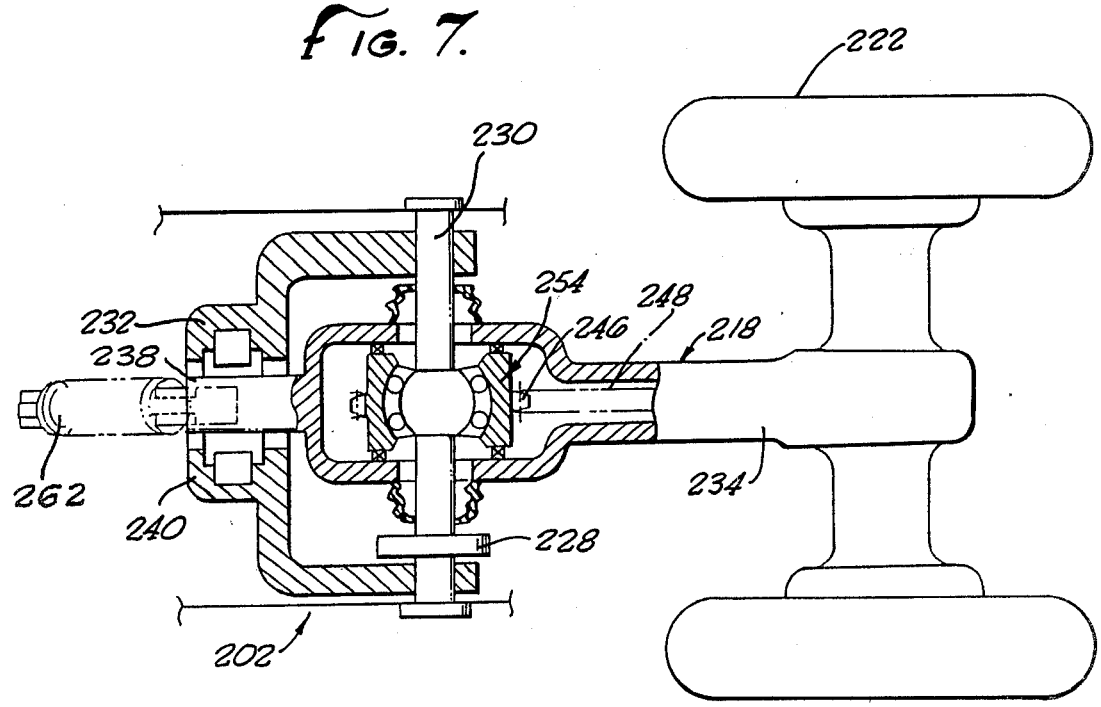
FIG. 7 is a cross-sectional plan view of the device of FIG. 6.

Looking then to a second embodiment as illustrated in FIGS. 6 and 7, the amount of extended unsprung weight is further reduced by placing a substantial part of the rear body mechanism at the forward end of the rear body, located within the front body.

As with the first embodiment, the tricycle includes a front body 202 and a rear body 218. An engine 226 is again mounted on the front body 202 and extends to a gear wheel 228 rotatably mounted about a shaft 230. The rear body 218 is divided into a first body member 232 and a second body member 234. In this second embodiment, the first body member 232, pivoted about the shaft 230, contains a journal box 240 arranged along a longitudinal axis of the vehicle. A cushion member 262 extends between the front body 202 and a bracket 264 located on the first body member 232.

The second body member 234 extends rearwardly to a position about the rear axle 236 which is mounted therein. The rear wheels 222 are in turn mounted to the rear axle 236.

The drive train in this second embodiment is located within the second body member 234. The drive train includes a drive sprocket 246 located about the shaft 230 with a constant velocity universal joint 254 employed to allow the required flexibility between the sprocket 246 and the shaft 230. A driven sprocket 250 is rigidly coupled to the rear axle 236 to accept a chain 248 for driving the rear wheels 222.

To allow for the rolling of the front body 202 relative to the rear body 218 a journal 238 extends forwardly to the journal box 240 located on the first body member 132. Again, a Neidhart mechanism may be employed at this journal.

Figure 8:
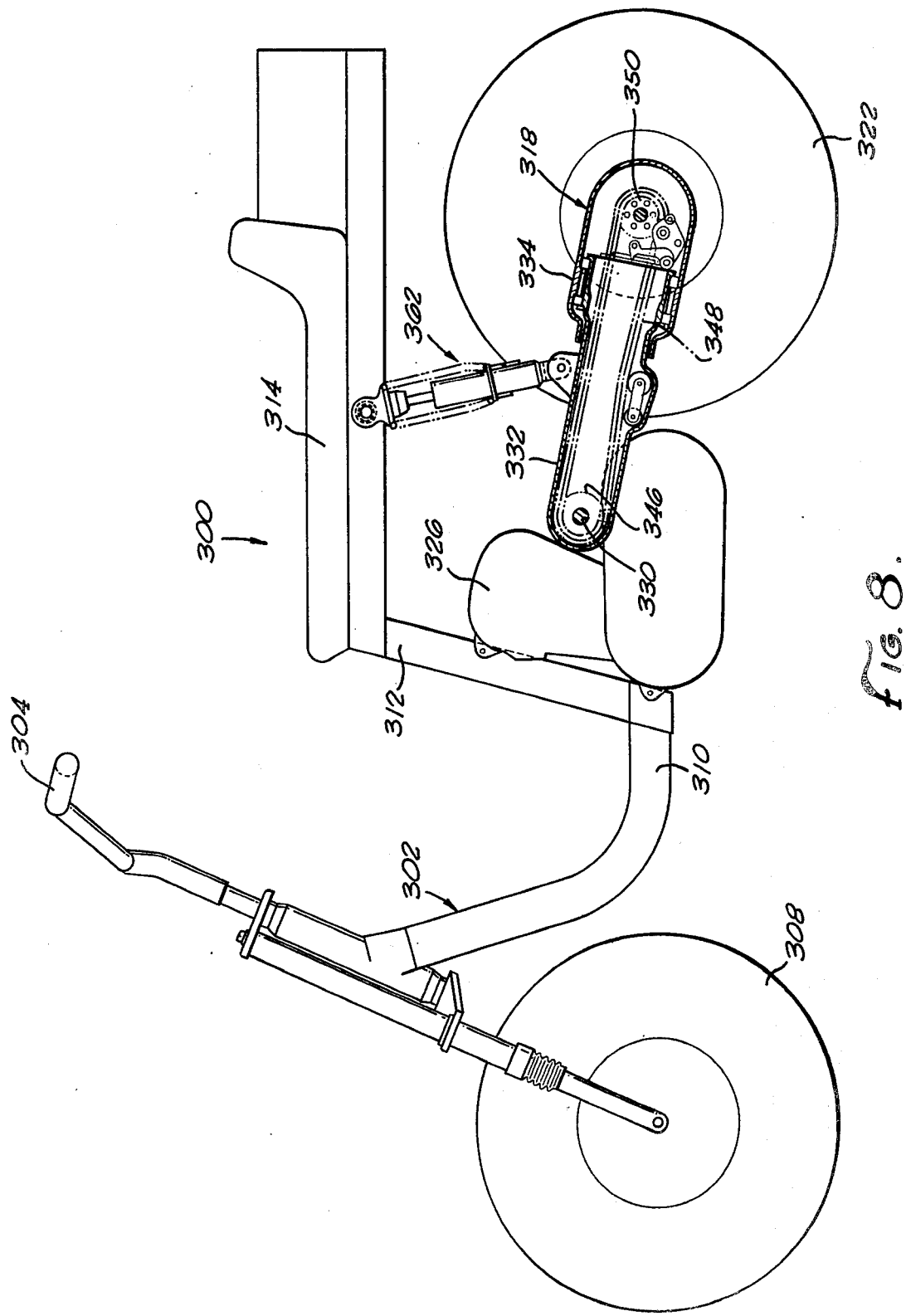
FIG. 8 illustrates yet another embodiment of the present invention in side elevation.
Figure 9:
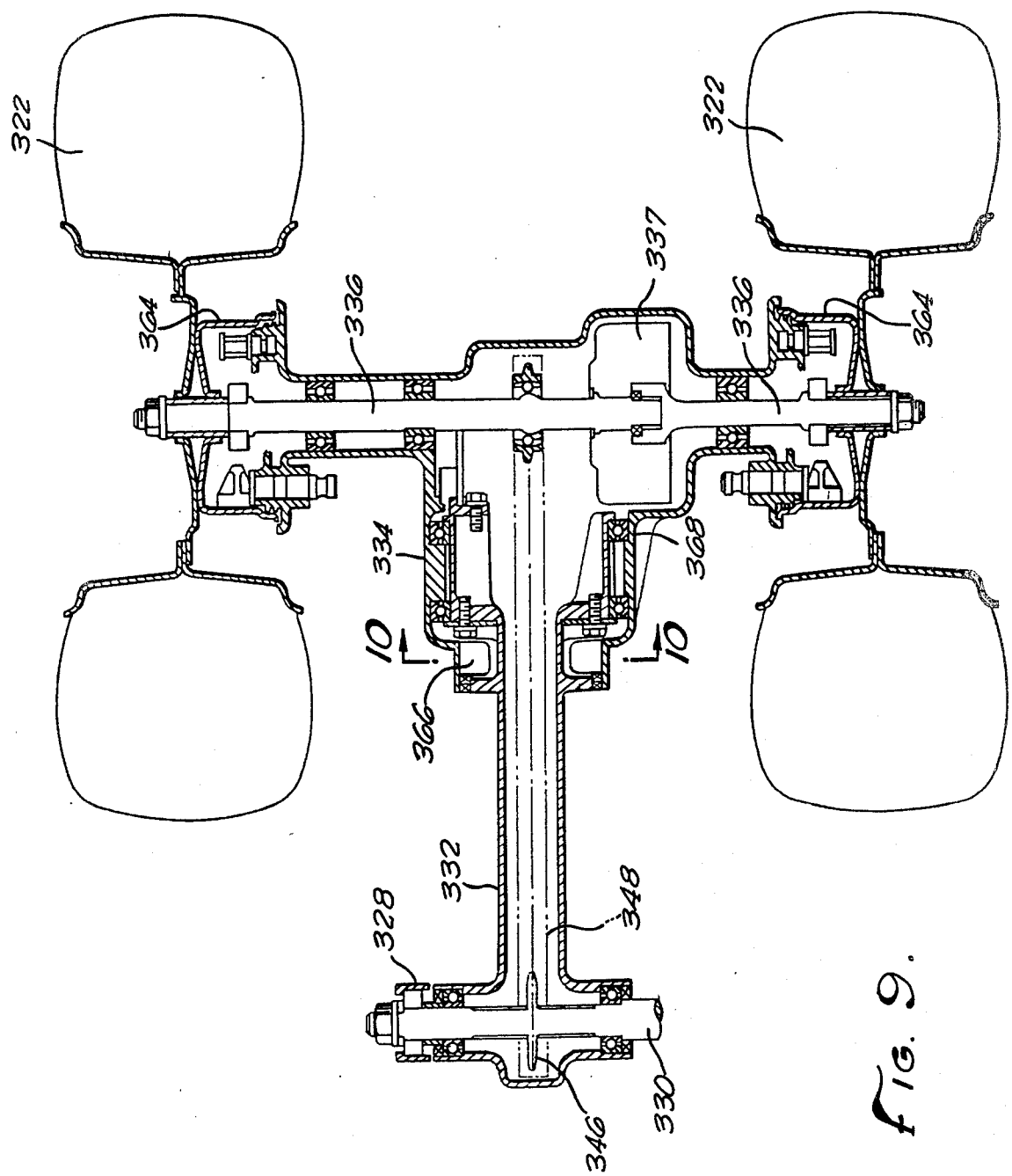
FIG. 9 is a cross-sectional plan of the rear portion of the embodiment of FIG. 8.
Figure 10:
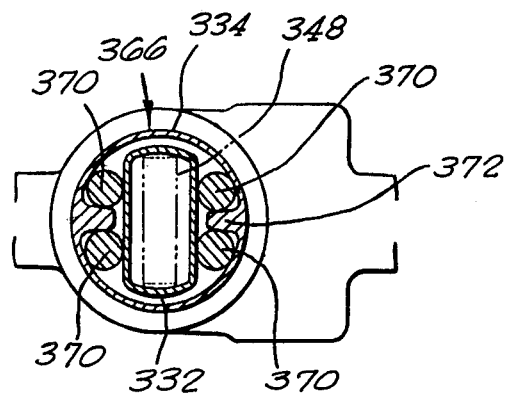
FIG. 10 is a cross-sectional elevation taken along line 10—10 of FIG. 9.

Looking then to a third embodiment as illustrated in FIGS. 8-12, a similar arrangement is disclosed. In FIG. 8, the frame of the front body is more clearly illustrated and the rear body has taken on to a greater extent the attributes of a suspension and drive train system. In fact, the actual body panels may be provided solely by the front body in this embodiment.

To avoid mere repetition, reference is mar'; to the foregoing descriptions of the first and second embodiments. The numerals employed with this third embodiment correspond to that of the first and second embodiments with the exception that they are in the 300's rather than the 100's and 200's.

Turning then specifically to the rear body 318, a first body member 332 and a second body member 334 are disclosed. The first body member 332 is pivotally mounted about a shaft 330. The shaft 330 is driven by an engine 326 through a drive wheel 328. Included on the shaft 330 is a drive sprocket 346. Associated with the drive sprocket 346 is a chain 348 which extends rearwardly to a driven sprocket 350. The driven sprocket 350 is located about a rear axle 336 rotatably mounted in the second body member 334. It may be noted that the wheels 322 are proportionally larger in this embodiment. Hence, a differential gear mechanism 337 is provided to enhance cornering and the like. Dust covers 364 are positioned about the axle 336 at either wheel 322 to prevent dust and the like from entering the power train and suspension system.

The second body member 334 is pivotally mounted to the first body member 332 about a longitudinal axis in an area between the transverse axis of the shaft 330 and the rear axle 366. A modified Neidhart mechanism is employed at this rolling joint, generally designated 366. Bearings 368 journal the first body member 332 in the second body member 334. Resistance to rolling of the two body members relative to one another is provided by resilient elements 370 held relative to the second body member 334 by means of flanges 372. The noncircular cross section of the first body member 332 adjacent the resilient elements 370 causes the elements to be compressed when relative rotation between the body members occurs.

Figure 11:
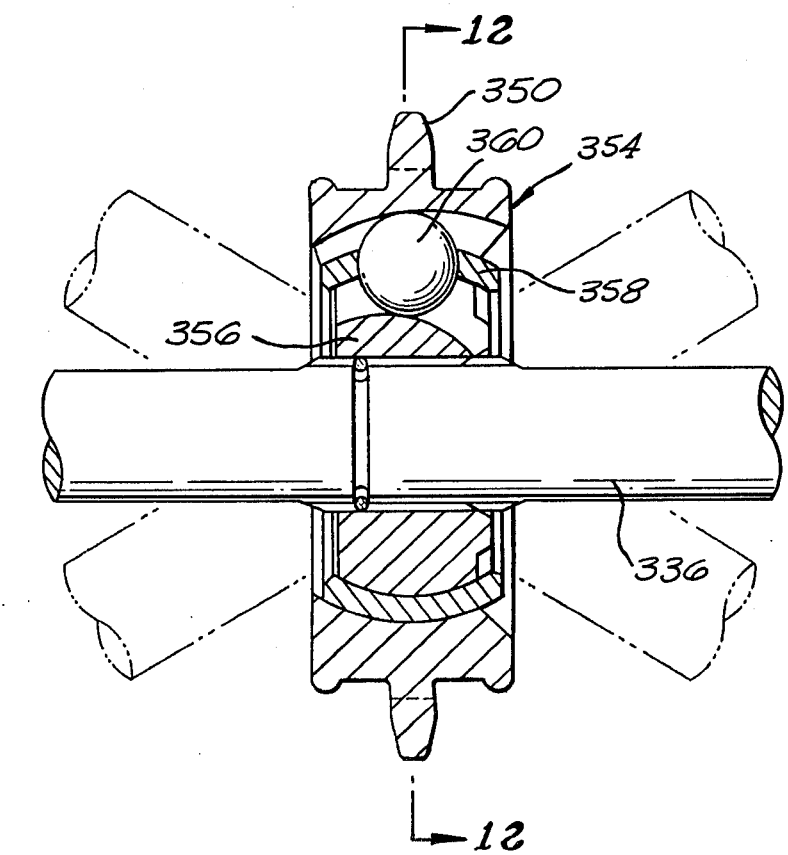
FIG. 11 is a detailed cross-sectional elevation of a constant velocity universal joint and axle associated with the present invention.
Figure 12:
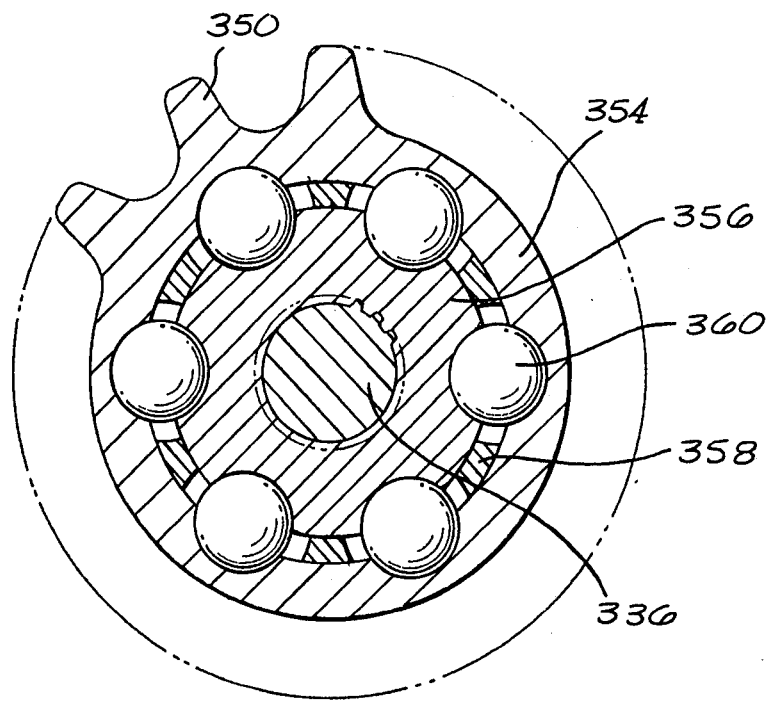
FIG. 12 is a cross-sectional elevation taken along line 12—12 of FIG. 11.

A universal joint employed with the present invention, in this embodiment about the rear axle 336 is illustrated in FIGS. 11 and 12. As noted before, the device includes a driven sprocket 350 about an outer ring 354. The outer ring is associated with an inner ring 356 fixed by splines to the axle 336. A ball cage 358 is positioned between the outer ring 354 and inner ring 356 and retains balls 360 which roll in the customary grooves cut into the outer and inner rings 354 and 356.

Thus, several embodiments of the present invention defining improved articulated tricycles of the swingable type have been disclosed. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A tricycle comprising
a front body;
a rear body, said front body and said rear body being pivotally coupled about a transverse axis of the tricycle therebetween, said rear body including a first body member pivotally mounted about said transverse axis and a second body member pivotally mounted to said first body member about a longitudinal axis of the tricycle;
an engine mounted to said front body; and
a power train mounted to said rear body, said engine and said power train being coupled at said transverse axis.

2. The tricycle of claim 1 wherein said front body includes a front support means for supporting said front body on a surface and said rear body includes rear support means for supporting said rear body on said surface, said rear support means retaining said second body member from rolling relative to said surface, said front support means allowing rolling of said front body relative to said support surface.

3. The tricycle of claim 2 wherein said power train is coupled to said rear support means for directing power thereto.

4. The tricycle of claim 1 wherein said power train is mounted within said first body member.

5. The tricycle of claim 1 wherein said power train is mounted within said second body member.

6. A tricycle comprising
a front body including a front wheel;
a rear body including two rear wheels, a first body member and a second body member, said front body and said rear body being pivotally coupled about a transverse axis of the tricycle therebetween, said first body member being pivotally mounted about said transverse axis and said second body member being pivotally mounted to said first body member about a longitudinal axis of the tricycle and supporting said rear wheels;
an engine mounted to said front body; and
a power train mounted to said rear body and coupled with said rear wheels, said engine and said power train being coupled at said transverse axis.

7. The tricycle of claim 6 wherein said power train includes a drive wheel rotatably mounted about said transverse axis and being driven by said engine, an axle extending between said two rear wheels, a driven wheel fixed to rotate with said axle and a flexible loop extending between said drive wheel and said driven wheel.

8. The tricycle of claim 7 wherein said driven wheels contains a constant velocity universal joint on said axle.

9. The tricycle of claim 7 further including a transverse drive shaft coupled with said engine and extending along said transverse axis, said drive wheel including a constant velocity universal joint being mounted on said drive shaft to rotate therewith.

10. The tricycle of claim 6 wherein said power train is mounted within said first body member.

11. The tricycle of claim 6 wherein said power train is mounted within said second body member.

12. The tricycle of claim 6 further including a cushion member extending between said front body and said rear body.

13. The tricycle of claim 6 wherein a Niedhart mechanism is provided between said first body member and said second body member to pivotally join said first and second body members about said longitudinal axis.

14. The device of claim 6 wherein said first body member and said second body member are journaled between said transverse axis and said rear wheels.

* * * * *